(12) United States Patent
Lynn et al.

(10) Patent No.: US 7,177,942 B1
(45) Date of Patent: Feb. 13, 2007

(54) METHOD FOR CHANGING FIBRE CHANNEL SPEED OF A DRIVE LOOP WITH ESM-CONTROLLED DRIVE BOXES USING REDUNDANT DRIVE CHANNELS

(75) Inventors: James A. Lynn, Rose Hill, KS (US); Jeremy D. Stover, Wichita, KS (US); Jason M. Stuhsatz, Wichita, KS (US); Dan A. Riedl, Andover, KS (US); Timothy Flynn, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 682 days.

(21) Appl. No.: 09/998,734

(22) Filed: Oct. 31, 2001

(51) Int. Cl.
*G06F 15/16* (2006.01)
(52) U.S. Cl. ................. 709/233; 709/228; 370/229
(58) Field of Classification Search ........ 709/208–209, 709/233, 223; 370/304, 503, 512; 713/400
See application file for complete search history.

(56) References Cited

U.S. PATENT DOCUMENTS 6,507,923 B1 * 1/2003 Wall et al. .................. 714/712
6,629,216 B1 * 9/2003 Mulvey et al. ............. 711/154

OTHER PUBLICATIONS

Fibre Channel Framing and Signaling (FS-FS) Rev. 1.30 NCITS working draft proposed. American National Standard for Information Technology. Jul. 9, 2001. pp. ii, 17, 24, 36, 532-546.*
Fibre Channel Framing and Signaling (FC-FS) Rev. 1.30 NCITS working draft proposal. American National Standard for Information Technology. Jul. 9, 2001. pp. ii, 17, 24, 36, 532-546.*
Fibre Channel Framing and Signaling (FC-FS) Rev. 1.30 NCITS working draft proposal. American National Standard for Information Technology. Jul. 9, 2001.*
Fibre Channel Framing and Signaling (FC-FS) Rev. 0.50 NCITS working draft proposal. American National Standards for Information Technology. Sep. 19, 2000.*

* cited by examiner

*Primary Examiner*—Jason Cardone
*Assistant Examiner*—Jeffrey R. Swearingen
(74) *Attorney, Agent, or Firm*—Suiter Swantz PC LLO

(57) ABSTRACT

The present invention discloses a system for adjusting the speed of operation of a channel for communicating with disk drives in a multi ported system, comprising a bridge controller having a first channel and a second channel and a plurality of enclosure services modules, each having a first channel connected in sequence from a bridge controller to a first enclosure services module and successively connected to successive enclosure services modules to a last enclosure services module and each having a second channel connected in reverse sequence from the bridge controller to the last enclosure services module and successively connected to the successive enclosure services modules to the first enclosure services module. In the disclosed method for changing the speed of operation of a channel, a change speed is performed on either the first or second channel and the other of the first and second channel is used to send change speed frames from the bridge controller to each of the plurality of enclosure services modules.

16 Claims, 2 Drawing Sheets

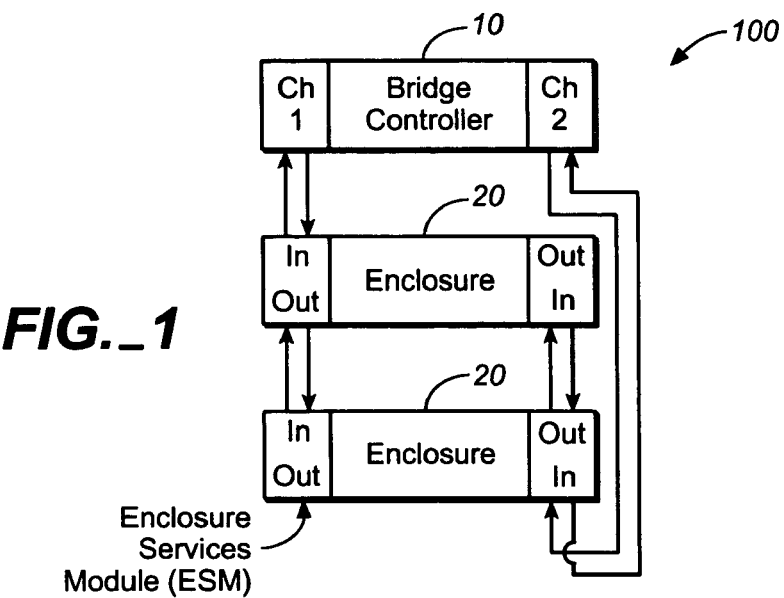
FIG._1
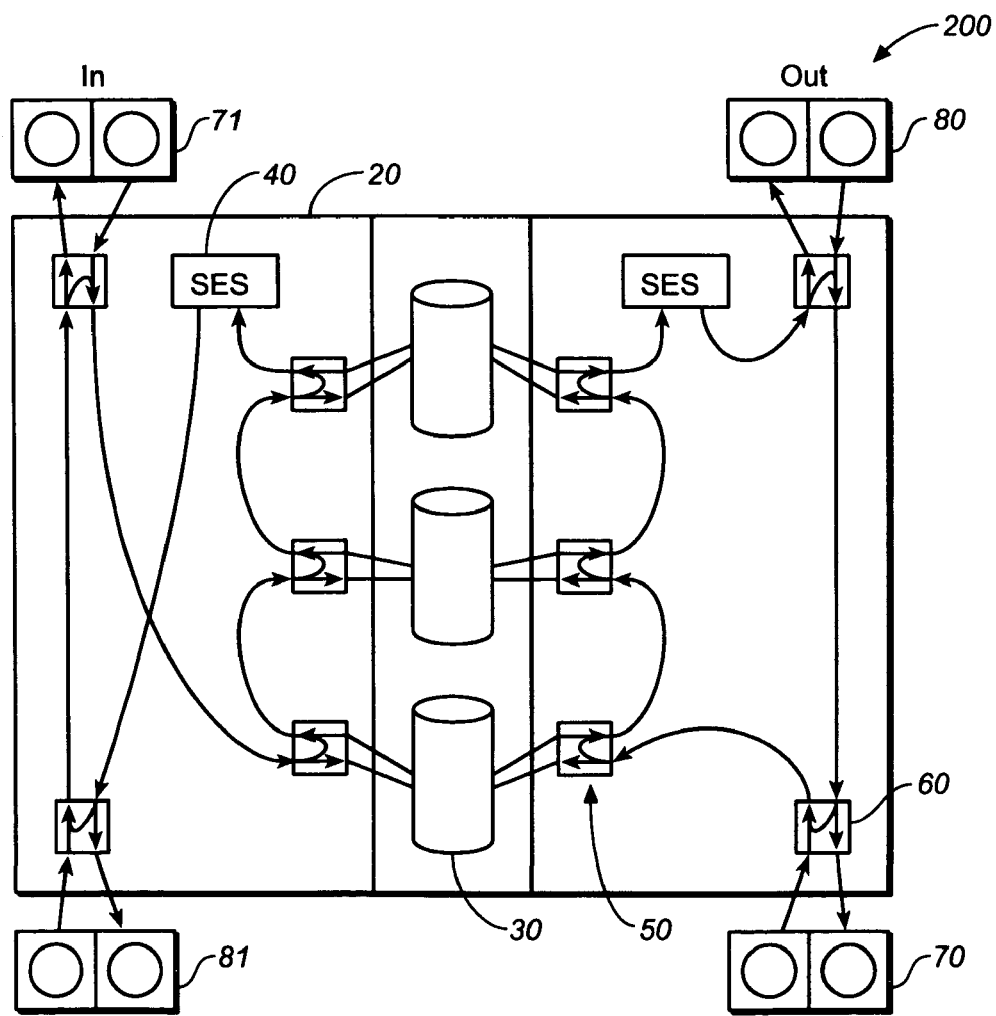
FIG._2

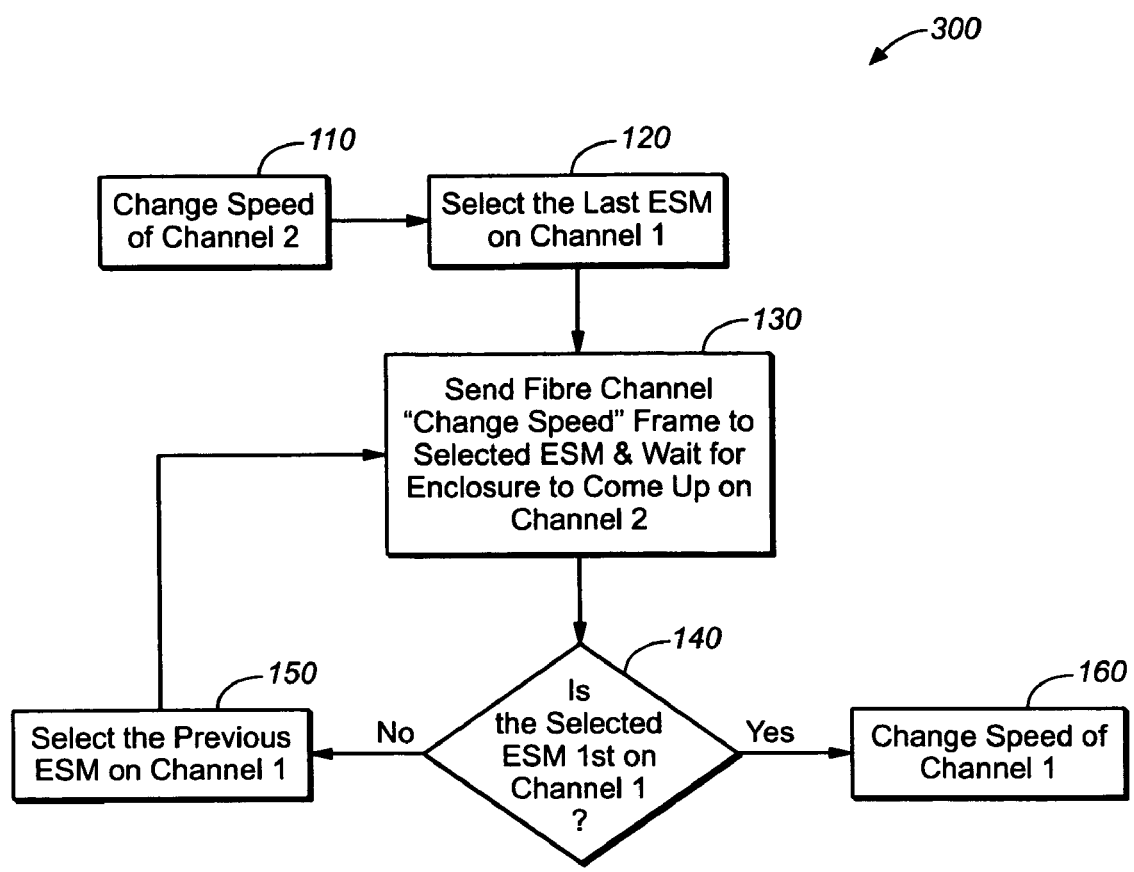
FIG._3

METHOD FOR CHANGING FIBRE CHANNEL SPEED OF A DRIVE LOOP WITH ESM-CONTROLLED DRIVE BOXES USING REDUNDANT DRIVE CHANNELS

FIELD OF THE INVENTION

The present invention generally relates to the field of data communications storage, and particularly to a bridge controller used in conjunction with dual-ported fibre channel disk drives that have multi-speed capability and are physically organized into multiple enclosures, each of which is managed by an enclosure services component.

BACKGROUND OF THE INVENTION

The fibre channel is a serial data communication network architecture and protocol for interconnecting computers and peripheral devices. The fibre channel supports several protocols, including the Small Computer System Interface (SCSI) protocol, an ANSI standard for controlling peripheral devices by one or more host computers. The computer or peripheral devices are connected to the network through fibre channel ports or other means. The host contains the fibre channel port. The fibre channel port uses a local data bus, such as a peripheral computer interface (PCI) bus, to implement data transfers.

Because the high bandwidth and connection flexibility it offers, fibre channel is often used for connecting peripheral devices within multi-disk drive enclosures, such as redundant arrays of inexpensive disks (RAIDs), and for connecting multi-disk drive enclosures with one or more host computers. These multi-disk drive enclosures offer great economy, greater storage, and redundancy that improve operational reliability.

Malfunctioning enclosures can, in certain cases, degrade or disable communications. There is the possibility of inserting a disk drive that is incapable of operating at the speed its enclosure has established for its remaining drives. There are no physical limitations which would prevent this event from occurring.

In the prior art, it is up to the enclosure services component to detect that the drive is not communicating properly and effectively remove it from the fibre loop by asserting its bypass control line. This has the effect of presenting information that indicates that the drive has failed without any indication that the reason the drive has failed is only because of its mismatched speed.

Therefore, it would be desirable to provide a method for changing disk drive speeds in a controlled manner. It would also be desirable to provide such a method with simplified circuitry.

SUMMARY OF THE INVENTION

Accordingly, the present invention is directed to an apparatus having disk drives which are physically organized into multiple enclosures and a method for adjusting the speed of the disk drives. In a first aspect of the present invention, a method is employed for changing the speed of a channel on the enclosure services channel.

The present invention discloses a method for adjusting the speed of operation of a channel for communicating with disk drives in a multi ported system organized into a plurality of enclosure services modules and having a first channel connected in sequence from a bridge controller to a first enclosure services module and successively connected to successive enclosure services modules to a last enclosure services module and a second channel connected in reverse sequence from the bridge controller to the last enclosure services module and successively connected to the successive enclosure services modules to the first enclosure services module, the steps comprising: changing the speed of either the first or second channel on the bridge controller and using the other of the first and second channel to send the change speed frame from the bridge controller to each of the plurality of enclosure services module.

The present invention discloses a system for adjusting the speed of operation of a channel for communicating with disk drives in a multi ported system, comprising a bridge controller having a first channel and a second channel and a plurality of enclosure services modules, each having a first channel connected in sequence from a bridge controller to a first enclosure services module and successively connected to successive enclosure services modules to a last enclosure services module and each having a second channel connected in reverse sequence from the bridge controller to the last enclosure services module and successively connected to the successive enclosure services modules to the first enclosure services module It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 illustrates a system diagram;

FIG. 2 illustrates a schematic block diagram of an enclosure services module; and FIG. 3 illustrates a flowchart of the steps taken in changing the disk speed of the enclosures.

DETAILED DESCRIPTION OF THE INVENTION

The present invention relates to a multi-speed algorithm which uses the bridge controller as the central point of speed control.

Reference will now be made in detail to the presently preferred embodiments of the invention, examples of which are illustrated in the accompanying drawings.

Referring generally now to FIGS. 1 through 3, exemplary embodiments of the present invention are shown.

The fibre channel is a serial data communication network architecture and protocol for computers, workstations, and peripheral devices. The fibre channel port includes serial transmitter and receiver components coupled to a communications medium via a link that has wires made of a signal transmitting material. It could be metal wire, optical fiber, or some other transmissive material.

In fibre channel, data is transferred one bit at a time at extremely high transfer rates. The smallest unit of data, or grouping of data bits, supported by an fibre channel network is a 10-bit character. Fibre channel primitives are made up of 10-byte characters or bytes. Certain fibre channel primitives carry control information exchanged between fibre channel ports. The next higher level of data organization, fundamental to fibre channel protocol, is the frame. A frame may be formed of between several to several thousand bytes of data according to the type of data included. The fibre channel protocol specifies a next higher organizational level called the sequence.

A physical layout of an enclosure partitioned disk drive system is shown in FIG. 2. The enclosure services module and its drives constitute the enclosure. In a data processing system having a data processor coupled to a channel, such as an SCSI channel, disposed for transmitting and receiving data between the data processor and a peripheral storage subsystem, a bridge controller 10 for expanding the maximum allowable number of disk drives is connectable to the channel. The bridge controller 10 comprises a microprocessor having input/output terminals coupled to a CPU bus; a memory; a buffer; and additional circuitry coupled to the disk drives; and, a circuit for controlling the direction of data flow through the buffer. The circuit has input/output terminals coupled to the CPU bus and a control output coupled to a direction control input terminal of the buffer. The bridge controller 10 is a target controller that uses the channel to connect to the peripheral device. Bridge controllers are commonly used in RAID arrays.

An in port and an out port of channel ch 1 of the bridge controller is connected by cable to the respective first pair of input and output ports 71 of a first enclosure services module 20 through which signals of channel pass through to the corresponding second pair of input and output ports 81 of the first enclosure services module 20. The second pair of input and output ports of the first enclosure, in turn, are connected to a pair of input and output ports of a second enclosure. The connections are made in such a manner until all the enclosure services modules are connected to channel 1.

The electrical connections are made, in reverse order, for channel ch 2. In this case, the bridge controller's channel 2 is connected first to the last module which was connected for channel ch 1. Then, the next to the last module to be connected is connected to the last module. As shown in FIG. 2, the first pair of ports 70 of channel ch 2 are internally connected to a bypass 60. Bypass 60 can route the signals through a set of bypasses 50 which feed the signals to the disk devices 30. SES 40 is an SCSI device that monitors and controls enclosure services to enable the enclosure services module to perform certain functions such as channel speed changes and bypassing logic. The first pair of input and output ports 70 of channel ch 2 is connected to the corresponding second pair of input and output ports 80 in a manner which signals of channel pass through.

The present invention relates to a multi-speed algorithm which uses the bridge controller as the central point of speed control. To change speed, the bridge controller performs the following steps.

Various frame formats known from the prior art may be used. The enclosure services module is responsible for changing the speeds of all of its drives when it receives the change speed frame. Driving the speed control pins to the new speed value does this. The drive is responsible for recognizing, on the fly, that the speed has changed.

This algorithm works if there are at least two channels from the bridge controller to the enclosure services modules. The wiring is as depicted in FIG. 1. One channel is wired in reverse of the other channel(s). When an enclosure services module receives a change speed frame, it informs the other enclosure services modules on the same enclosure, so the speed setting of the entire enclosure is changed.

The ESM determines the speed capacity of a disk drive by trying two or more speeds and then checking to determine if the drive operates properly at the various speeds.

FIG. 2 illustrates the process steps in making a disk drive speed change. The bridge controller changes the speed on channel ch 2 110. A change speed frame is sent to an enclosure services module (beginning with the last enclosure connected on channel ch 1) 120. This enclosure services module receives the speed change frame and changes the internal speed of its enclosure drives. The bridge controller waits for an indication on channel 2 that the enclosure drives have attained the changed speed. The bridge controller then determines whether the enclosure currently undergoing speed change is the first enclosure connected on channel 1 140. If the enclosure currently undergoing speed change is also the first enclosure connected on channel 1, the bridge controller changes the speed on the bridge controller 160 on channel 1 and waits for an indication on channel 1 that all of the enclosure drives have attained the desired speed. Processing then stops 170. If the enclosure currently undergoing speed change is not the first enclosure connected on channel 1, the speed change process continues with the enclosure immediately preceding the current enclosure on channel 1 150. The processing continues until the first enclosure is reached and processed.

The advantage of this approach is that the change is done in a controlled manner. One of the problems inherent in integrating a fibre channel solution is that the control of some behavior is distributed across the components. This, of course, can work fine, and, in many cases, is necessary. However, it does create the potential for interoperability problems between components. When these problems arise, the state of the system can become unstable.

As the bridge controller provides centralized control, the invention does not suffer interoperability problems.

It is believed that the system and method for changing fibre channel speed of a drive loop with ESM-controlled drive boxes using redundant drive channels of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for adjusting the speed of operation of a channel for communicating with disk drives in a multi ported system organized into a plurality of enclosure services modules comprising:
   a first channel connected to a first enclosure services module and successively connected to successive enclosure services modules to a last enclosure services module in sequence,
   a second channel connected to the last enclosure services module and connected, in reverse sequence relative to the first channel, to successive enclosure services modules, to the first enclosure services module, and
   a bridge controller connected to the first enclosure services module via the first channel and to a last enclosure services module via the second channel,
   the steps comprising:

(a) sending a change speed frame from the bridge controller to the last enclosure services module connected on the first channel which has not undergone the speed change;
(b) waiting for an indication on the second channel that the enclosure has attained the changed speed;
(c) determining whether the enclosure service module currently undergoing speed change is the first enclosure service module on the first channel; and
(d e) repeating the steps (b), (c), (d) and (e) with the enclosure services module which precedes, on the first channel, the enclosure services module currently undergoing speed change if the enclosure services module currently undergoing speed change is not the first enclosure service module on the first channel.

2. The method of claim 1, wherein each of the plurality of enclosure services modules has the speed of its enclosure changed on the second channel.

3. The method of claim 2, wherein there is a third channel.

4. The method of claim 2, wherein the disk drives are fibre channel disk drives.

5. The method of claim 2, wherein change speed frame is in a frame format.

6. The method of claim 2, wherein the disk drives recognize, on the fly, that the speed has been changed.

7. A system for adjusting the speed of operation of a channel for communicating with disk drives in a multi ported system, comprising:
a bridge controller having a first channel and a second channel; and
a plurality of enclosure services modules, each on the first channel connected in sequence from a first enclosure services module and successively connected to successive enclosure services modules to a last enclosure services module and each on the second channel connected in reverse sequence as compared to the first channel from the last enclosure services module and successively connected to the successive enclosure services modules to the first enclosure services module,
wherein the bridge controller sends a speed change frame to each of the plurality of enclosure service modules on the first channel in sequence from the last enclosure services module to the first enclosure services module and the second channel is a channel for which the speed is to be changed and the multi ported system includes more than two ports.

8. The system of claim 7, wherein the each of the first and second channel is bi-directional.

9. The system of claim 7, wherein the disk drives are fibre channel disk drives.

10. The system of claim 7, wherein the enclosure services modules each have bypass circuitry to bypass individual disk drives.

11. The system of claim 7, wherein the enclosure services modules each have a microprocessor.

12. A system for passing a signal to a chain of electrically connected devices having a first channel and a second channel, comprising:
a controller device for sending a command signal through the first channel to change a speed of the second channel; and
a plurality of subservient devices for receiving the command signal sent from the controller device, each of the plurality of subservient devices executing commands based on the command signal,
wherein the controller device is connected in an open chain manner to the subservient devices in both a forward order through the first channel and in a physically separate reverse order through the second channel.

13. The system of claim 12, wherein the forward connection and the reverse connection define the first channel and the second channel.

14. The system of claim 12, wherein the controller device is a bridge controller and the subservient devices are enclosure services modules for disk drives.

15. The system of claim 14, wherein the command signal is a speed change frame in a frame format and the disk drives are fibre channel disk drives.

16. The system of claim 15, wherein system employs a method for passing a command signal to a chain of electrically connected devices having at least two channels, comprising:
using one of the channels to pass the command signal to the chain of electrically connected devices; and
using the other of the channels to make changes to a parameter regarding the chain of electrically connected devices for that channel.

* * * * *